(12) United States Patent
Solimano

(10) Patent No.: US 8,490,069 B2
(45) Date of Patent: Jul. 16, 2013

(54) METHOD FOR VALIDATING A GRAPHICAL WORKFLOW TRANSLATION

(75) Inventor: Marco Solimano, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 1540 days.

(21) Appl. No.: 12/072,874

(22) Filed: Feb. 28, 2008

(65) Prior Publication Data

US 2008/0216058 A1    Sep. 4, 2008

(30) Foreign Application Priority Data

Mar. 2, 2007 (EP) .................................. 07004330

(51) Int. Cl.
G06F 9/45 (2006.01)

(52) U.S. Cl.
USPC .......... 717/138; 717/128; 717/141; 717/126; 717/151

(58) Field of Classification Search
USPC ... 717/101–178; 704/4; 706/46–47; 715/203; 700/1–306
See application file for complete search history.

(56) References Cited

U.S. PATENT DOCUMENTS

| | | | | |
|---|---|---|---|---|
| 5,946,673 A | * | 8/1999 | Francone et al. | 706/13 |
| 6,029,002 A | * | 2/2000 | Afifi et al. | 717/131 |
| 6,044,211 A | * | 3/2000 | Jain | 716/102 |
| 6,584,601 B1 | * | 6/2003 | Kodosky et al. | 716/103 |
| 6,647,301 B1 | * | 11/2003 | Sederlund et al. | 700/79 |
| 6,681,383 B1 | * | 1/2004 | Pastor et al. | 717/126 |
| 7,543,270 B1 | * | 6/2009 | Grace | 717/110 |
| 7,707,562 B1 | * | 4/2010 | Kaltenbach | 717/136 |
| 7,725,200 B2 | * | 5/2010 | Reed et al. | 700/30 |

(Continued)

OTHER PUBLICATIONS

NPL—Formal Validation of PLC Programs: A Survey; S. Lampérière-Couffin, O. Rossi, J.-M. Roussel, J.-J. Lesage; University Laboratory in Automated Production Research; Ecole Normale Supérieure de Cachan—61, avenue du Président Wilson—94235 Cachan Cedex—France; Jul. 6, 1999.*

(Continued)

*Primary Examiner* — Lewis A Bullock, Jr.
*Assistant Examiner* — Francisco Aponte
(74) *Attorney, Agent, or Firm* — Laurence A. Greenberg; Werner H. Stemer; Ralph E. Locher

(57) ABSTRACT

A method for validating a translation of a graphical workflow of activities into an arbitrary, but structured language uses as input a term of a high level graphically expressed language having a number of graphical elements related logically to each other and analyzes its content and/or structure in order to translate this content and/or structure into a structured set of instructions. The graphical workflow of activities is simulated to arrive at a first set of activity results. Each instruction is translated into a generic language in order to trace the execution of such instruction to arrive at a second set of results from the translated instructions. The first set of activity results is compared with the second set of results, and the translation is validated in case of a match among the first set of activity results and the second set of results.

5 Claims, 3 Drawing Sheets

U.S. PATENT DOCUMENTS

| | | | |
|---|---|---|---|
| 7,752,608 B1* | 7/2010 | Hinchey et al. | 717/136 |
| 7,802,238 B2* | 9/2010 | Clinton | 717/136 |
| 2003/0033137 A1* | 2/2003 | Holubar et al. | 704/4 |
| 2004/0243921 A1* | 12/2004 | Carr et al. | 715/500 |
| 2005/0159828 A1* | 7/2005 | Deininger et al. | 700/87 |
| 2006/0041872 A1* | 2/2006 | Poznanovic et al. | 717/140 |
| 2007/0067755 A1* | 3/2007 | Hinchey et al. | 717/135 |
| 2008/0126407 A1* | 5/2008 | Shimaoka et al. | 707/103 Y |
| 2008/0209391 A1* | 8/2008 | Iborra et al. | 717/105 |
| 2010/0050097 A1* | 2/2010 | McGreevy et al. | 715/762 |

OTHER PUBLICATIONS

"Translation Validation: From Signal to C"; Weizmann Institute of Science, Rehovot, Israel; 1999; pp. 231-255; XP002442915.

"Un environnement graphique pour le langage Siganl"; IRISA, Campus Universitaire De Beaulieu, France; Sep. 1993; pp. 1-41; XP002442916.

"Defining and Validating Transformations of UML Models"; Faculty of Computer Science, Electrical Engineering and Mathematics University of Paderborn, Germany; 2003; XP10678611.

* cited by examiner logical and ⇒

METHOD FOR VALIDATING A GRAPHICAL WORKFLOW TRANSLATION

BACKGROUND OF THE INVENTION

The present invention relates to a method for validating a translation of a graphical workflow of activities into an arbitrary, but structured language.

In the world of process automation and monitoring standard automation systems for controlling the widest conceivable variety of machines and plants are state of the art. Such technology covers a broad range of products which are offered by the Siemens Corp. under its SIMATIC® product family. An extensive line of products for solving the technical tasks in question such as counting, measuring, positioning, motion control, closed-loop control and cam control enhance the performance capabilities of appropriate process controllers. A variety of configurations enable the implementation of flexible machine concepts.

In this context a broad range of IT solutions exist to connect the actual hardware close to the technical and/or logistical process to the application layer of the client driving the installation. Manufacturing execution systems have therefore been developed to meet all of the requirements of a service oriented architecture (SOA) to integrate seamless into a totally integrated automation (TIA). A plug & play architecture, in which individual functions can be easily combined and configured with each other thereby forms the basis for this success.

These demands very often require in the backbone rather complicated and sophisticated software solutions which enable the approach of totally integrated automation. In view of this, the software engineers very often create a new software by means of a high level graphical language which identifies the workflow of activities within the software. Subsequently, this string/term of high level graphical language has to be translated into a client based software language executable on the machine language level. This translation requires tremendous efforts in programming and need serious testing to check whether the translated program behaves the same as the original string/term of the high level graphical language.

SUMMARY OF THE INVENTION

It is therefore an object of the present invention to provide a method for simplifying the translation and evaluation process in order to check Whether a translation can be validated.

This object is achieved by a method for validating a translation of a graphical workflow of activities into an arbitrary, but structured language. The method uses as input a term of a high level graphically expressed language having a number of graphical elements related logically to each other and analyzes its content and/or structure in order to translate this content and/or structure into a structured set of instructions. The graphical workflow of activities is simulated to arrive at a first set of activity results. Each instruction is translated into a generic language in order to trace the execution of such instruction to arrive at a second set of results from the translated instructions. The first set of activity results is compared with the second set of results, and the translation is validated in case of a match among the first set of activity results and the second set of results.

This method allows therefore to validate a translation using a structural analyzer which identifies the instruction into which the original term of the graphical language has to be translated and to derive according to the instructions at the second set of results which can be compared to the first set of activity results stemming from the original term of graphical language. By following the instructions in terms of not performing real actions but tracing its execution, the set of results can be considered as an execution path list. Therefore, it is then rather simple to compare the first set of activity results and the second set of results in order to validate a translation.

To both facilitate the programming by placing the graphical elements of the high level graphically expressed language and to enable the proper translation of the complete term of the graphical workflow, one embodiment comprises a structural analyzer analyzing and translating the terms of the high level graphically expressed language in terms of their graphically expressed content and/or their graphically expressed connections into the respective structured set of instructions. Further, after recognizing the content and the structure of the graphical workflow, the structural analyzer uses a translation dictionary to derive at the structured set of instructions, preferably by maintaining the relationship under the original graphical elements. This allows when programming by using and setting the graphical elements within the desired logical structure to use a predefined vocabulary defining both the possibilities and the limitations of both the programming and the translating.

To arrive at the set of results that can be considered as an execution path list, another preferred embodiment provides each instruction as an action block tracing its input and output arguments. Another helpful measure might be the fact that within the predefined vocabulary a possible instruction exists that is a translation of the graphical element into a conditional block to which both a FALSE status and a TRUE status is assigned.

As already mentioned earlier, the logical correctness of the translation can be quite easily compared when the first set of activity results and the second set of results is an execution path list of the logical sequence of the graphical workflow and of the action blocks respectively. Therefore, the translation process as the whole can be considered to be quite generic since the process is rather independent from the type of high level graphically expressed language and the rather simple but extensive language on the machine level used.

BRIEF DESCRIPTION OF THE SEVERAL VIEWS OF THE DRAWINGS

Preferred examples of the present invention are described hereinafter with reference to the following drawings, in which.

DETAILED DESCRIPTION OF THE INVENTION

Figure 1:
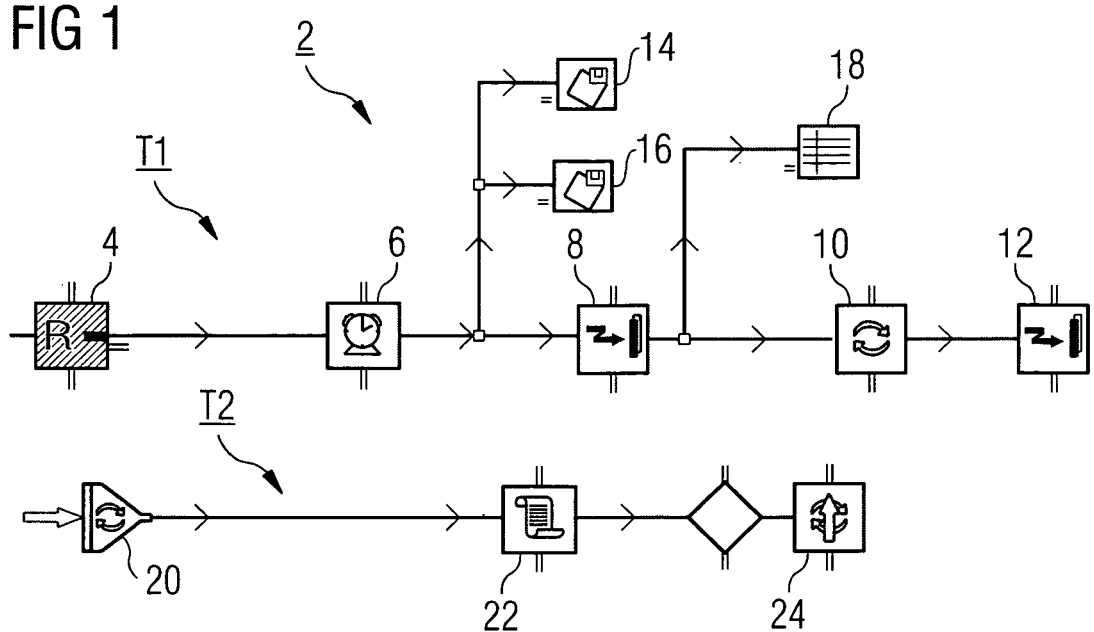
FIG. 1 shows an example for a graphical workflow having two terms of activities.

FIG. 1 schematically illustrates an example for a graphical workflow 2 comprising two terms T1, T2 of activities which are represented by various graphical elements 4 to 24. The graphical elements 4 to 24 may stand for a broad variety of different tasks within a process automation control system. The graphical elements 4 to 24 are selected from a library which may comprise all kind of admissible activities within the process automation control system. The programming of the control system can be, for example, done by a drag & drop procedure which allows to place the graphical elements in the desired logical order having the desired logical interconnections among each other (where applicable). This graphical workflow 2 is represented by a high level graphically expressed language which has to be translated into an adequate language to be operated on the machine level.

Figure 2:
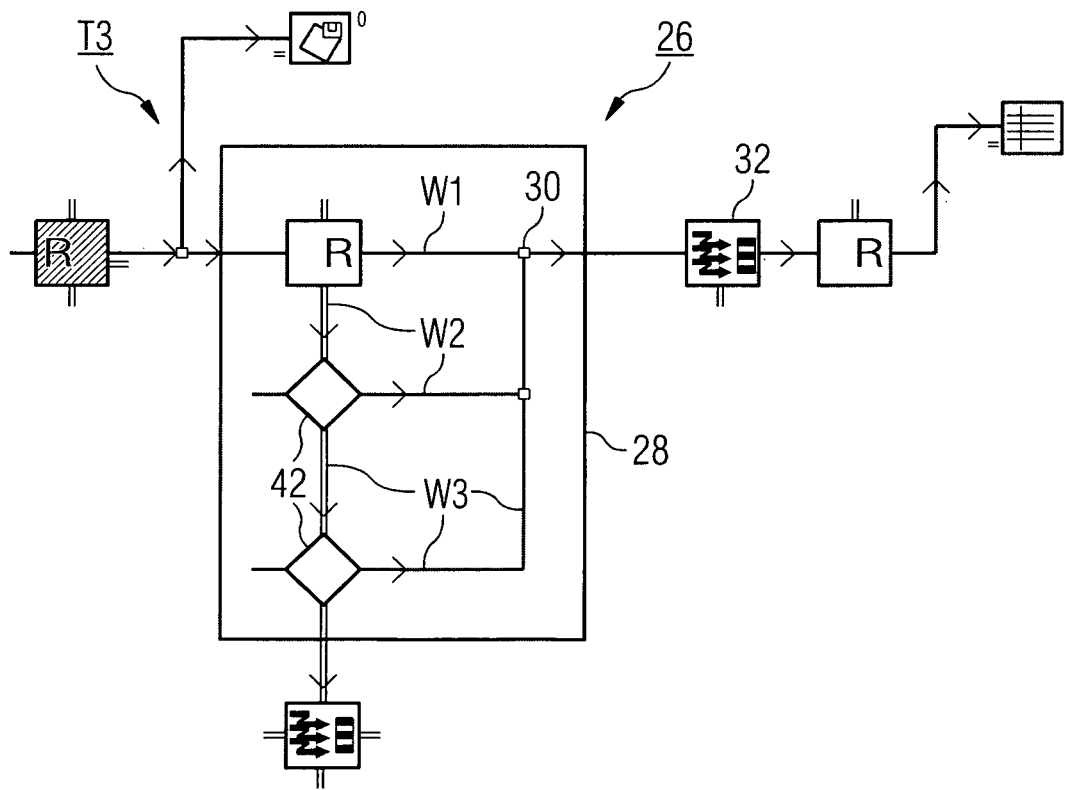
FIG. 2 shows an example for a logical OR workflow.

FIG. 2 illustrates schematically another graphical workflow 26 comprising a term T3 which comprises itself a number of graphical elements representing specific logical activities (graphical elements not numbered here). In a box 28 an example for a logical OR structure is given. In the box 28, three ways w1, w2 and w3 are given to arrive at a point 30 to continue the graphical workflow at a graphical element 32.

Figure 3:
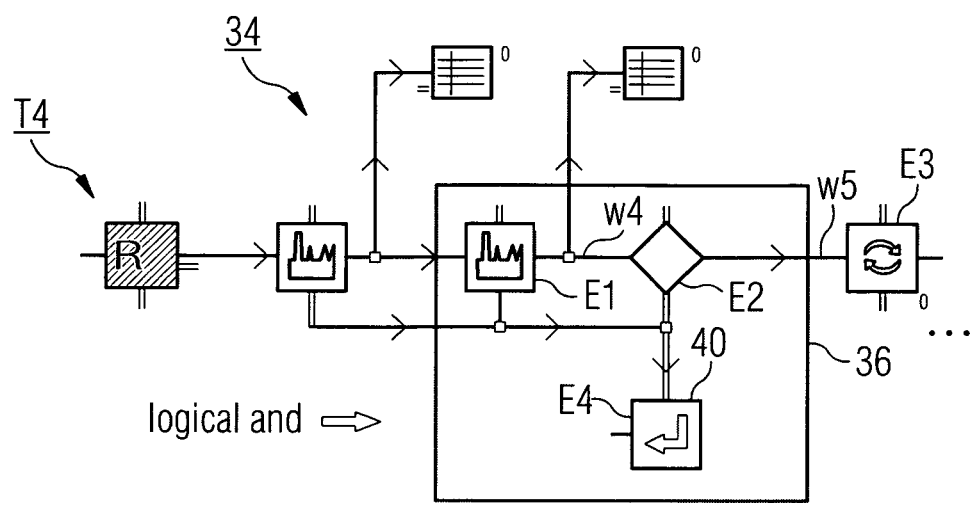
FIG. 3 shows an example for a logical AND workflow.

FIG. 3 now illustrates schematically another graphical workflow 34 comprising a term T4 which itself comprises a number of graphical elements representing specific logical activities (graphical elements also not numbered here). Each graphical element can proceed execution in one of two possible paths, according to the element value.

In a box 36, an example for a logical AND structure is given. In the box, both ways w4 AND w5 are required to arrive at a point 3 (i.e.: both elements numbered with E1 and E2 must receive the value "TRUE"). A graphical element E4 in the box 36 is reached if and only if the above condition is not fulfilled.

Figure 4:
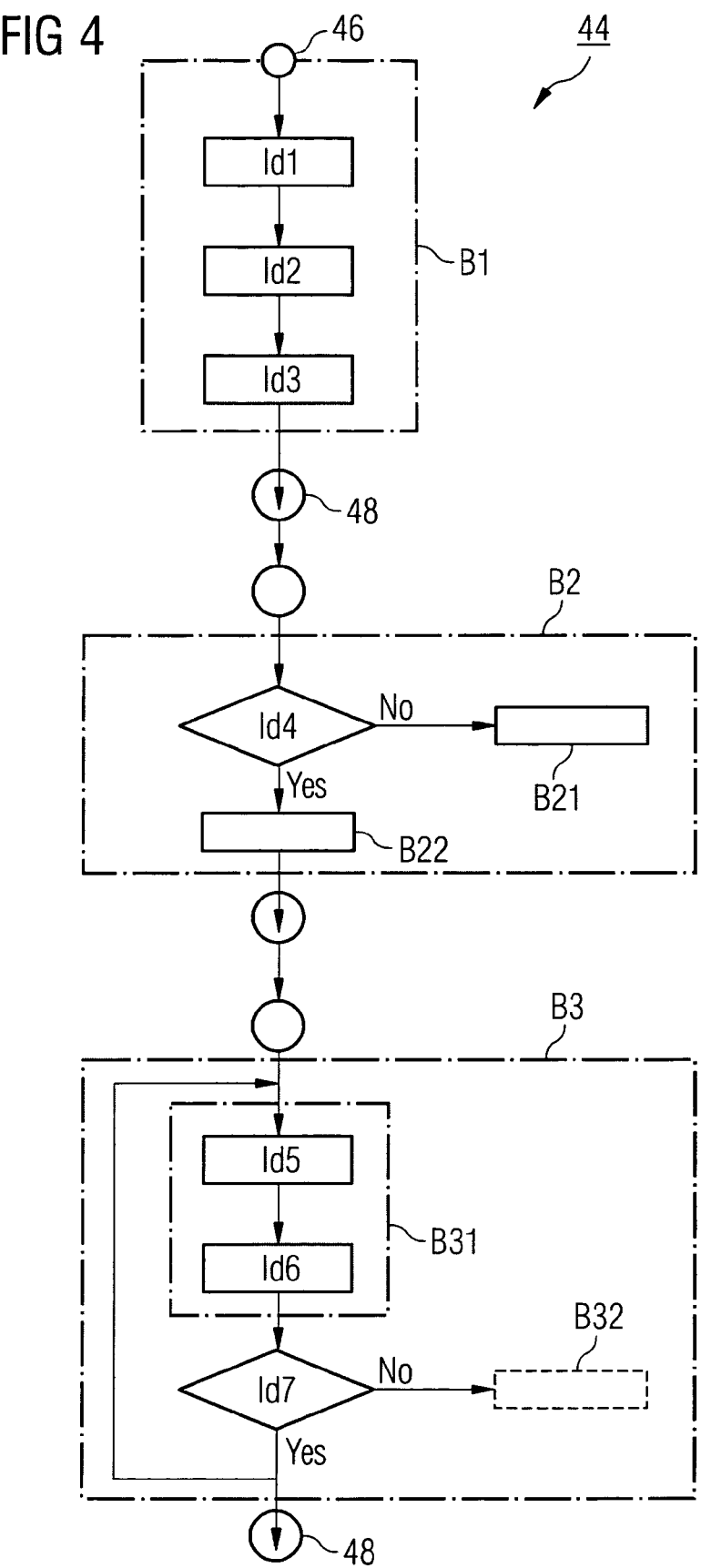
FIG. 4 shows an example for a graphical workflow prepared for translation.

FIG. 4 now shows a simplified example for a graphical workflow 44 separated into three branches B1, B2 and B3. Each branch B1, B2 and B3 is defined as a logical unit having a single input 46 and a single output 48. This graphical workflow 44 is now the input for a structural analyzer (not shown since this is a generic software program) which identifies each identity Id1, ID2, ID3 of each graphical element of the original workflow 44. These identity can be now considered as a set of instructions which are logically related to each other. A set of results for the branches B1, B2, B3 B21, B22, B31, B32 which represents the translation of these instructions into a simple language sounds as follows:

Branch B1: (Id1, Id2, Id3)
Branch B2: (Id4, (B21)) if Id4 is TRUE and (Id4, (B22)) otherwise
Branch B3: ((Id5, Id6), Id7, B32) if Id7 is TRUE and ((Id5, Id6), Id7) otherwise.

This list of results for each branch B1, B2, B3 represents an execution path list which means that the identities Id1 to Id7 representing a functional block do not perform real actions in this process but the set of results traces the flow of executing the various activities given by the graphical elements in the original graphical workflow 2, 26, 34.

The individual set of results of each branch B1, B2 and B3 are now combined into a final result list which is stored in the control system. On the other hand, the execution of the source workflow as given by the graphical workflow 2, 26, 34 is emulated in a way that each graphical element will be reduced either to a source action block which instead of performing real actions only traces its execution or to a conditional block to which both false and true status are assigned without evaluating it. The result of this emulation will also identify the identities Id1 to Id7 of the original graphical workflow and is also stored in the control system as a first set of results stemming from the emulation.

Afterwards, these two sets of results, namely the final result list and the first set of results, are compared to each in order to figure out whether the translation of the original workflow into a simple language delivers the same logical workflow as the original graphical workflow. In case of a match, the translation is considered to be approved that means being validated for the use in a practical environment.

What is claimed is:

1. A method for validating a translation of a graphical workflow of activities within a process automation control system into an arbitrary, but structured language, comprising:
   using as input a term of a high level graphically expressed language comprising a number of graphical elements related logically to each other, the graphical elements representing tasks within the process automation control system;
   analyzing and translating by a structural analyzer the terms of the high level graphically expressed language in terms of at least one of graphically expressed content and graphically expressed connections into the respective structured set of instructions;
   emulating the graphical workflow of activities to arrive at a first set of activity results;
   translating each instruction into a generic language in order to trace execution of such instruction to arrive at a second set of results from the translated instructions; and
   comparing the first set of activity results with the second set of results and validating the translation in case of a match among the first set of activity results and the second set of results.

2. The method of claim 1, wherein after recognizing the content and the structure of the graphical workflow, the structural analyzer uses a translation dictionary to derive at the structured set of instructions.

3. The method of claim 1, wherein each instruction is an action block tracing its input and output arguments.

4. The method of claim 1, wherein the instruction is translated into a conditional block to which both a FALSE status and a TRUE status is assigned.

5. The method of claim 1, wherein the first set of activity results and the second set of results is an execution path list of the logical sequence of the graphical workflow and of the action blocks respectively.

* * * * *